United States Patent
Catanzano

(10) Patent No.: US 7,707,636 B2
(45) Date of Patent: *Apr. 27, 2010

(54) SYSTEMS AND METHODS FOR DETERMINING ANTI-VIRUS PROTECTION STATUS

(75) Inventor: M. Bernard Catanzano, Hoover, AL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 56 days.

This patent is subject to a terminal disclaimer.

(21) Appl. No.: 12/132,138

(22) Filed: Jun. 3, 2008

(65) Prior Publication Data

US 2008/0235800 A1  Sep. 25, 2008

Related U.S. Application Data

(63) Continuation of application No. 10/225,304, filed on Aug. 21, 2002, now Pat. No. 7,383,579.

(51) Int. Cl.
*G06F 11/00* (2006.01)
*G06F 12/14* (2006.01)
*G06F 12/16* (2006.01)
*G08B 23/00* (2006.01)

(52) U.S. Cl. .................................. 726/24; 713/188
(58) Field of Classification Search ............. 726/24; 713/188
See application file for complete search history.

(56) References Cited

U.S. PATENT DOCUMENTS

| | | | |
|---|---|---|---|
| 5,821,937 A | 10/1998 | Tonelli et al. | |
| 5,889,943 A * | 3/1999 | Ji et al. | 726/22 |
| 5,889,958 A | 3/1999 | Willens | |
| 5,933,647 A | 8/1999 | Aronberg et al. | |
| 6,035,423 A * | 3/2000 | Hodges et al. | 714/38 |
| 6,061,798 A | 5/2000 | Coley et al. | |
| 6,085,243 A | 7/2000 | Fletcher et al. | |
| 6,108,420 A | 8/2000 | Larose et al. | |
| 6,108,782 A | 8/2000 | Fletcher et al. | |
| 6,219,786 B1 * | 4/2001 | Cunningham et al. | 713/152 |
| 6,229,540 B1 | 5/2001 | Tonelli et al. | |
| 6,269,456 B1 * | 7/2001 | Hodges et al. | 714/38 |
| 6,282,711 B1 | 8/2001 | Halpern et al. | |
| 6,292,569 B1 | 9/2001 | Shear et al. | |
| 6,298,445 B1 * | 10/2001 | Shostack et al. | 726/25 |

(Continued)

OTHER PUBLICATIONS

Lyman, Jay, "In Search of the World's Costliest Virus", NewsFactor Network, http://www.newsfactor.com/perl/story/10407.html, Feb. 21, 2002, Last Downloaded Dec. 30, 2008.

(Continued)

*Primary Examiner*—David García Cervetti
(74) *Attorney, Agent, or Firm*—Myers Bigel Sibley & Sajovec

(57) ABSTRACT

A method to automatically determine a computer's current level of anti virus protection is described. When a client machine submits a request, a request filter determines if the version of the anti-virus protection software present on the user's computer is sufficient to allow access to the requested destination. If the version of anti virus software on client machine is not sufficient, then the request filter directs the request to an alternate location.

20 Claims, 3 Drawing Sheets

U.S. PATENT DOCUMENTS

| | | | |
|---|---|---|---|
| 6,412,008 B1* | 6/2002 | Fields et al. | 709/228 |
| 6,415,313 B1* | 7/2002 | Yamada et al. | 709/200 |
| 6,574,660 B1* | 6/2003 | Pashupathy et al. | 709/217 |
| 6,694,145 B2* | 2/2004 | Riikonen et al. | 455/502 |
| 6,732,179 B1* | 5/2004 | Brown et al. | 709/229 |
| 6,742,043 B1* | 5/2004 | Moussa et al. | 709/232 |
| 6,763,395 B1* | 7/2004 | Austin | 709/245 |
| 6,789,201 B2* | 9/2004 | Barton et al. | 726/24 |
| 6,820,116 B1* | 11/2004 | Pyhalammi et al. | 709/219 |
| 6,826,698 B1* | 11/2004 | Minkin et al. | 726/1 |
| 6,834,329 B2* | 12/2004 | Sasaki et al. | 711/134 |
| 6,842,861 B1* | 1/2005 | Cox et al. | 713/188 |
| 6,873,988 B2* | 3/2005 | Herrmann et al. | 707/10 |
| 6,892,241 B2* | 5/2005 | Kouznetsov et al. | 709/229 |
| 6,895,433 B1* | 5/2005 | Slater et al. | 709/220 |
| 6,938,077 B2* | 8/2005 | Sanders | 709/219 |
| 6,966,034 B2* | 11/2005 | Narin | 715/744 |
| 6,966,059 B1* | 11/2005 | Shetty et al. | 717/172 |
| 6,986,047 B2* | 1/2006 | Giles et al. | 713/175 |
| 6,993,593 B2* | 1/2006 | Iwata | 709/238 |
| 7,010,500 B2* | 3/2006 | Aarnio | 705/26 |
| 7,010,807 B1* | 3/2006 | Yanovsky | 726/24 |
| 7,016,944 B1* | 3/2006 | Meyer et al. | 709/218 |
| 7,069,316 B1* | 6/2006 | Gryaznov | 709/224 |
| 7,089,259 B1* | 8/2006 | Kouznetsov et al. | 707/102 |
| 7,140,012 B2* | 11/2006 | Pugh et al. | 717/170 |
| 7,152,164 B1* | 12/2006 | Loukas | 713/188 |
| 7,162,649 B1* | 1/2007 | Ide et al. | 713/165 |
| 7,178,166 B1* | 2/2007 | Taylor et al. | 726/25 |
| 7,383,579 B1 | 6/2008 | Cantanzano | |
| 2002/0023159 A1* | 2/2002 | Vange et al. | 709/228 |
| 2002/0051449 A1* | 5/2002 | Iwata | 370/389 |
| 2002/0129277 A1* | 9/2002 | Caccavale | 713/201 |
| 2002/0138760 A1* | 9/2002 | Naitoh | 713/201 |
| 2003/0007464 A1* | 1/2003 | Balani | 370/310 |
| 2003/0014603 A1* | 1/2003 | Sasaki et al. | 711/158 |
| 2003/0055994 A1* | 3/2003 | Herrmann et al. | 709/229 |
| 2003/0065793 A1* | 4/2003 | Kouznetsov et al. | 709/229 |
| 2003/0070088 A1* | 4/2003 | Gryaznov | 713/201 |
| 2003/0088716 A1* | 5/2003 | Sanders | 709/330 |
| 2003/0101246 A1* | 5/2003 | Lahti | 709/221 |
| 2003/0143988 A1* | 7/2003 | Jamadagni | 455/418 |
| 2003/0154300 A1* | 8/2003 | Mostafa | 709/231 |
| 2003/0227477 A1* | 12/2003 | Kadiwala | 345/748 |
| 2004/0054860 A1* | 3/2004 | Dixit et al. | 711/160 |
| 2004/0093595 A1* | 5/2004 | Bilange | 717/171 |
| 2004/0152439 A1* | 8/2004 | Kimura et al. | 455/403 |
| 2004/0249864 A1* | 12/2004 | Laumen et al. | 707/200 |
| 2005/0132184 A1* | 6/2005 | Palliyil et al. | 713/152 |
| 2005/0132205 A1* | 6/2005 | Palliyil et al. | 713/188 |
| 2005/0144317 A1* | 6/2005 | Chase et al. | 709/238 |
| 2005/0262245 A1* | 11/2005 | Menon et al. | 709/226 |
| 2005/0262246 A1* | 11/2005 | Menon et al. | 709/226 |

OTHER PUBLICATIONS

SonicWall, Inc., "Virus Protection for Small to Medium Networks", 2001.

Reuters, "News: Technology—Virus costs skyrocket", http://www.cs.nmt.edu/~cs491_02/IA/viruscost.htm, Aug. 31, 2001.

Berners-Lee et al., RFC 1945—Hypertext Transfer Protocol—HTTP/1.0, May 1996.

* cited by examiner

SYSTEMS AND METHODS FOR DETERMINING ANTI-VIRUS PROTECTION STATUS

CROSS-REFERENCE TO RELATED APPLICATIONS

The present application is a continuation of U.S. patent application Ser. No. 10/225,304, filed on Aug. 21, 2002, issued Jun. 3, 2008 as U.S. Pat. No. 7,383,579, and entitled "Systems and Methods for Determining Anti-Virus Protection Status," which is hereby incorporated herein by reference.

FIELD OF INVENTION

The present invention generally relates to handling requests in a communications network. The present invention more particularly relates to handling requests based on the level of anti-virus protection present on the requesting computer.

BACKGROUND OF THE INVENTION

As the proliferation of the Internet increases, so to does the ease with which individuals and commercial entities perform electronic transactions. However, along with these positive advances comes the threat from cyber hackers, terrorists, and other elements that focus on attacking computer networks in general and the Internet in particular. The continual attacks cause large financial losses for commercial entities as well as a concomitant loss of confidence among ordinary users. Hence, the need for and the expectation of electronic security are now greater than ever.

Unlike physical structures, which are vulnerable to physical attacks, computer networks are vulnerable to both physical attack and "virtual" attacks. Hackers execute these virtual attacks using specially designed computer programs like viruses. Since computer systems are accessible from anywhere on a network to which they are attached, they can be harder to protect than a physical structure. For example, a would-be hacker can attack a computer network from computer systems located in foreign nations far removed from the threat of United States or other law enforcement.

As the complexity and effectiveness of anti-virus and anti-intrusion methods has increased, so has the creativity of the hackers. Conventionally, a multitude of specially designed computer programs exist that have the potential to damage computer system and the networks with which they communicate. For example, conventional viruses exist that infect program files, infect the boot sector of disk drives, execute under the guise of a macro, operate as worms or Trojan Horses, as memetic viruses, or use some other method to infect targeted systems. Each type of virus functions in an at least a somewhat different manner, making them collectively harder to fight.

For example, a "classic" virus is a computer program that instructs the computer to do something harmful. The classic virus can also replicate itself and spread from one computer to another. A worm can be an even more dangerous iteration of the classic virus. Many conventional viruses spread across a network by attaching themselves to legitimate messages or programs. A worm, however, does not need to attach itself to a specific computer program. Instead, a worm copies itself across computer systems and networks without attaching to a host program. In contrast, the Trojan Horse programs appear to do something desirable, but also perform a harmful secondary function. A common example is a Trojan Horse program that secretly steals passwords from an unsuspecting user.

The need for better Internet security has never been greater. In 2000, viruses caused $17.1 billion in damages (Reuters, Aug. 31, 2001, http://www.cs.nmt.edu/~cs491_02/IA/virus-cost.htm). Eradication of these programs can be very expensive. For example, according to Computer Economics, the "Love Bug" virus cost $8.75 billon to eradicate, the "Code Red" virus cost $2.62 billion, the "SirCam" virus cost $1.15 billion, and the "Nimda" virus cost $635 million (http://www.newsfactor.com/perl/story/16407.html). The major costs of virus cleanup include cleaning up infected machines, eradicating viruses, user downtime, and associated losses in productivity.

According to BusinessWeek Online, there are more than 36,000 known viruses and an average of 10-15 new viruses appear every day (http://www.internetnanager.com/productfamily/antivirus.shtml). Therefore, Internet security issues will continue to affect the financial health of commercial entities for the foreseeable future. A need exists to eliminate or at the very least minimize the effects of these conventional harmful computer programs.

Various conventional methods exist to control and eliminate computer viruses and other harmful programs. For example, anti-virus protection software can neutralize certain conventional viruses. When a virus is present on a computer system, the anti-virus software detects it. However, the effectiveness of the anti-virus software depends on how up-to-date the installed version of the software is on the computer system. One problem with these programs is that they rely on individual users to download current versions of the anti-virus software onto their systems. However, individual users, whose primary job function is not computer and network security and maintenance, tend not to actively update their computers for anti-virus software. Therefore, relying on individual users to update their anti-virus software is not an effective method to combat viruses and other harmful programs. Furthermore, if the virus software is outdated, a new virus that infects the user's computer may escape detection. If the virus goes undetected, when the user accesses an internal or external network server, the user may very well infect the server as well as any computers connected to a network to which the server is connected.

One conventional solution for the problem of maintaining effective virus protection is to assign a system administrator for a computer network to the task of monitoring anti-virus updates as they become available from the vendor. When they become available, the system administrator distributes the anti-virus software to individuals' computers without the active participation of the individual. The network administrator may utilize a centralized software management system to perform these updates. The centralized software management system distributes, updates and probes the computers on a network and automatically installs updates as directed by the system administrator. Examples of such management systems include, but are not limited to, Simple Network Management Tool, Novell IPX, Microsoft SMS, HP Open View, and IBM SNA.

Typically, these software management systems inventory the current software on each individual computer, allow distribution, extraction and updating of software from a central location, monitor the network for problems and provide other methods that enable effective network management. Therefore, when using a centralized software management system, a dedicated system administrator would automatically update the computer to make sure that the virus program was current.

Thus, the need for each user at each terminal to replicate this task is eliminated. Conventional systems focus on performing virus checks using these centralized software management systems to probe, monitor and update the network. Therefore, centralized software management systems achieve methods for network security. However, centralized software management systems are often expensive to implement and still rely on the system administrator to update the virus software.

U.S. Pat. No. 6,298,445 (the '445 patent) describes using a centralized management software system. The '445 patent describes a probe that monitors the system for security breaches and for security vulnerabilities. According to the '445 patent, the monitoring system assesses the operating systems of various computers and monitors the network for security vulnerabilities. Once the system administrator determines that enhancements are necessary, a push system sends the software enhancements to each system electronically.

However, not all computer networks have a network administrator who constantly updates individual computers' virus software. As the popularity and installed base of virtual private networks (VPN) increase, so does the risk of having unmanaged computers connected to the network. VPN systems are becoming increasingly popular because they provide cost savings by replacing more costly dedicated leased lines with secure connections across a public network. Furthermore, VPN systems do not require permanent links between sites, an advantage for users who need to travel. Unfortunately, with this freedom comes risk. If a remote computer becomes infected with a virus and accesses the VPN before receiving anti-virus software updates, the remote computer may infect the entire network.

A company may have other reasons for not utilizing a centralized software management system for managing every computer. For example, the cost of purchasing and implementing a centralized software management system may be prohibitive. Alternatively, a company may voluntarily choose not to link certain people's computers to the network because of the fear of compromising sensitive information present on certain computer systems. Therefore, in the absence of a centralized software management system, network security relies on individual users updating the virus protection programs on individual computers. In the absence of a diligent user performing these updates, harmful computer programs have an opportunity to attack an entire network. Thus, a solution is needed in which user security is maintained without the need for implementing a centralized software management system.

Another conventional solution to protect networks involves screening every data packet across the network for viruses and other harmful programs. U.S. Pat. No. 6,219,786 (the '786 patent) describes such a system. In the '786 patent, as data packets are transmitted throughout the network, each packet is analyzed at decision nodes distributed throughout the network. The decision nodes confirm if the user has the necessary security clearance to access/transmit that data across the network and check if the data packet has any viruses. If a virus is located in a data packet, the system alerts the user who is transmitting the virus. However, the system disclosed in the '786 patent requires decision nodes to screen every data packet transmitted across the network for viruses. For large networks, checking every data packet in every electronic transmission is impractical and cumbersome.

When a user accesses the Internet, the user is really accessing a computer server that contains the website. In principle, when accessing web pages or accessing a company server, the user is performing the same function, the user is accessing a server that contains the information the user wants. Users access servers or websites by many means. A user can access a website by a dedicated remote link or use an Internet browser and specify the address of the web page. The web page address merely directs the data packet to a computer server that contains the particular web page. Therefore, when the user requests to go to a particular website, the user is really specifying which file on a server the user wishes to access.

None of the conventional approaches to anti-virus protection provides a means of efficiently and effectively monitoring virus compliance of users whose systems are not maintained by a system administrator and without monitoring every data packet that is transmitted across the network. Such a means is needed.

SUMMARY OF THE INVENTION

Embodiments of the present invention provide systems and methods for handling requests, such as hypertext transfer protocol (HTTP) requests, in a computer network based on anti-virus protection information contained in the user agent string of the request. In one embodiment, a request filter extracts the anti-virus protection software version for the user agent string and, based on a comparison with a standard, either directs the request to the original destination or redirects the request to an alternate destination. In an embodiment of the present invention, the anti-virus protection version may be coded in any of a variety of ways, including as a unique, random code, a text string, a coordinated uniform date (UTC) string, or some other code.

In an embodiment of the present invention, the user agent string included in the request from a client computer includes the code identifying the anti-virus version level. The client computer is in communication with a network, which is also in communication with the request filter. Requests from the client computer are routed through the request filter rather than directed to the destination specified in the request. Various methods may be utilized to modify the string, including using a programmatic means to change the string on the fly, changing a registry setting in Microsoft Windows, changing an .ins file, and others.

The request filter in an embodiment of the present invention includes a processor. For example, the request filter may be a computer, a router with processing capabilities or a layer 7 switch. The request filter may also be integrated with another network component such as a proxy server or firewall.

The client computer or device in an embodiment of the present invention is capable of issuing a request, such as an HTTP request. For example, in one embodiment, a personal computer includes a web browser for issuing a HTTP request. The HTTP request includes a user agent string, which includes a code identifying the anti-virus protection software version.

Embodiments of the present invention provide numerous advantages over conventional systems for monitoring anti-virus compliance of individual users without the need for a system administrator. Embodiments of the present invention provide anti-virus compliance testing without requiring a dedicated system administrator who monitors and maintains each computer within the network to ensure anti-virus compliance. Embodiments of the present invention also eliminate the requirement of examining every data packet transmitted through the network for viruses. Eliminating the requirement to screen every data packet increases the speed of the network and overall data transmission rate and decreases the resources necessary to effectively implement and monitor the network.

Further details and advantages of the present invention are set forth below.

BRIEF DESCRIPTION OF THE DRAWINGS

These and other features, aspects, and advantages of the present invention are better understood when the following Detailed Description is read with reference to the following drawings wherein.

DETAILED DESCRIPTION OF THE INVENTION

Embodiments of the present invention provide systems and methods for handling requests in a computer network based on anti-virus protection information contained in the user agent string of the request. In one embodiment, a system according to the present invention includes a computer network, a processor in communication with the network, and a request filter installed on the processor. The request filter compares the anti-virus data contained in the user agent string of a request with a standard and then either directs the request to the original destination or redirects the request to an alternate destination based on the results of the comparison. In various embodiments, the request filter may be a switch, such as a layer-7 switch, or may be some type of server. A server is a processor, which is not generally used as a client computer and which is accessible by various client machines on a network.

Figure 1:
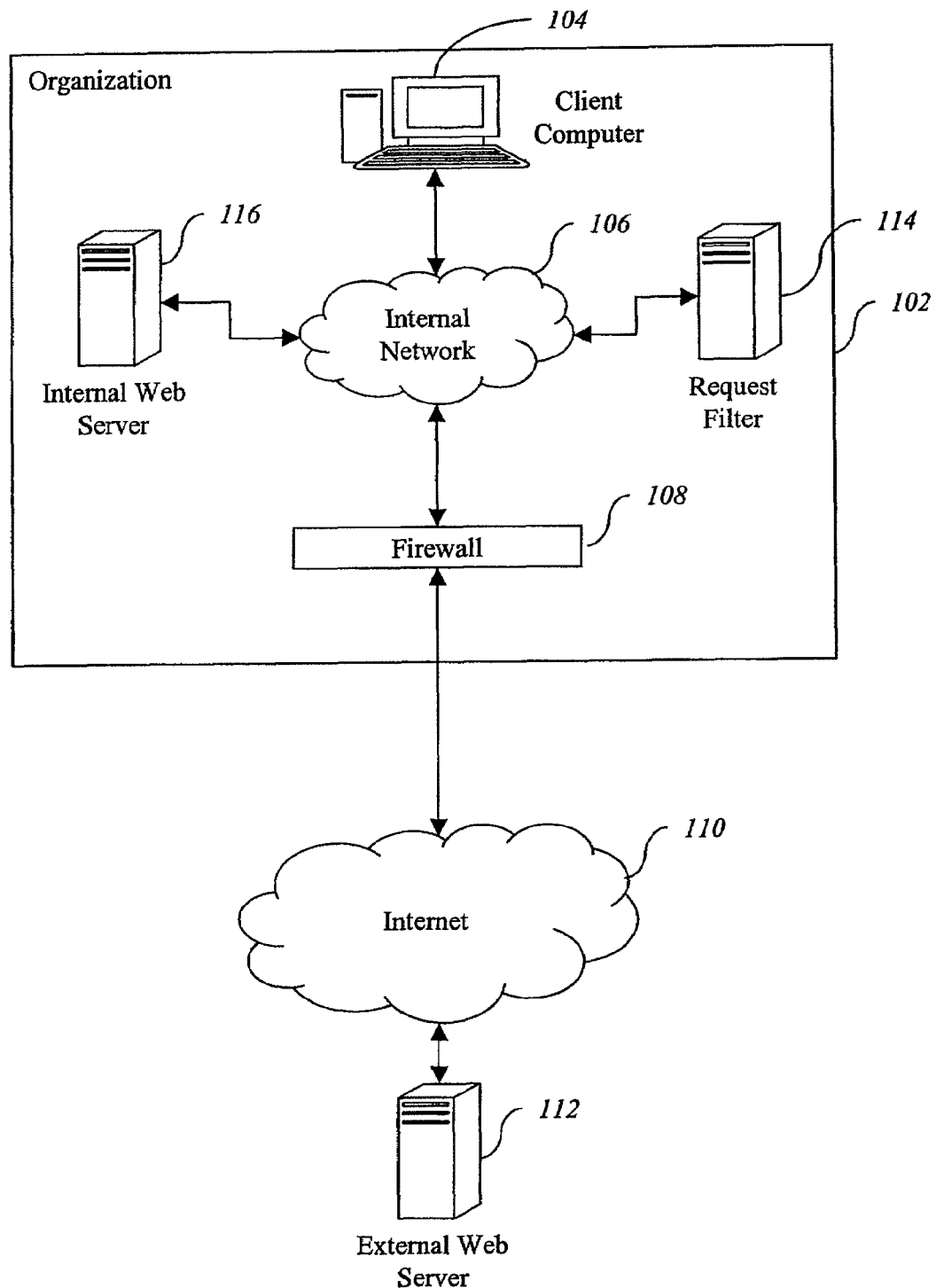
FIG. 1 is a block diagram illustrating an exemplary environment for operation of an embodiment of the present invention.

Referring now to the Figures in which like numerals indicate like elements throughout the several Figures, FIG. 1 illustrates an exemplary environment for operation of an embodiment of the present invention. In the embodiment shown, an organization 102 includes a client computer 104. The client computer 104 includes various software components, such as an operating system, an Internet browser, anti-virus software, an email client, and other components necessary for a member of the organization 102 to perform computerized functions. The client computer 104 may be, for example, a personal computer, such as a desktop, notebook, palmtop or hand-held computer, a mainframe computer, a mini computer, a workstation, a web-enabled cell phone, or any other device capable of executing the necessary software components. In the embodiment shown, the client computer 104 is a personal computer.

The anti-virus software installed on the client computer 104 acts to prevent the client computer 104 from downloading and/or executing viruses and other potentially harmful programs when the client computer 104 interacts with other client machines, servers, computers, or software. For example, in one embodiment, the anti-virus software periodically checks all of system files present on the client computer 104 for viruses or potentially harmful programs that may have infected the system. Anti-virus tools may also scan incoming data transmissions to client computer 104 to prevent viruses and other programs from infecting the client computer 104.

In the embodiment shown, the client computer 104 also includes a suite of Internet tools, including a web browser. When a user requests content using a web browser, the web browser creates a request. For example, when a user requests a hypertext markup language (HTML) page from a web server, the user enters a uniform resource locator (URL) string in the browser's address line. The browser uses the ULRL entered by the user to create a hypertext transfer protocol (HTTP) request and sends the request across a network. The request may include various bits of information. The request includes a header. The header includes a variety of information about the user and the request, including a user agent string. The user agent string includes information about the user's computing environment, including the type and version of the browser software that the user is utilizing.

For example, the user agent string of Netscape installed on Microsoft Windows 95 is typically includes Mozilla/9.99 (WinXX; I); for Microsoft's Internet Explorer, the string includes Mozilla/2.0 (compatible; MSIE 9.99; Update a; AOL 9.9; Windows XX); and for Opera, the user agent string includes be Mozilla/39.9 (compatible; Opera/9.9; Windows XX/NTX). For Internet browsers other than Netscape Navigator, the identification field typically includes the word "compatible" and an identifier of the specific Internet browser. "MSIE" in the case of Microsoft's Internet Explorer, and "Opera" in the case of Opera.

In the embodiment shown in FIG. 1, the client computer 104 also includes a file or software that modifies the user agent string so that the string includes anti-virus version information. For example, in one embodiment of the present invention, client computer 104 includes a PERL program operable for modifying the user agent string when a request is made to include the date of the currently installed anti-virus software in the user agent string of the browser. The program converts the date to coordinated universal time (UTC) or a portion of the UTC corresponding to the anti-virus program update date and inserts the value at the end of the then-existing user agent string. In another embodiment utilizing one of the Microsoft Windows family of operating systems, the anti-virus version information is stored in a registry setting, which the browser uses to construct the user agent string. In yet another embodiment utilizing a Microsoft Windows operating system, the ins file is modified and executed. Various other methods exist for modifying the user agent string and are well known by those skilled in the art. In embodiments of the present invention, a multitude of anti-virus data may be included in the user agent string, including, for example, the date the anti-virus software was downloaded, the version of anti-virus software currently installed, an identifier of the anti-virus software developer or distributor or any other information helpful in identifying the type and version of anti-virus software installed and/or used on the client computer 104.

In the embodiment shown in FIG. 1, client computer 104 is in communication with an internal network 106. The internal network 106 may be a wired or wireless network and may include Intranet functionality. In the embodiment shown, the internal network 106 is in communication with a firewall 108. The firewall 108 may include any combination of hardware or software necessary to prevent unauthorized access to the internal network 106 or to monitor the flow of data to and from the internal network 106. The firewall 108 is in communication with an external network. In the embodiment shown, the external network is the Internet 110. However, the external network may be another intranet, or any other private, public, or governmental computer network. The Internet includes a plurality of computers and computer networking equipment however, for the sake of simplicity, FIG. 1 includes only a single external web server 112. External web server 112 includes hardware and software necessary to "serve" web pages in response to requests received from the Internet 110.

In the embodiment shown, the organization also includes a request filter 114 in communication with the internal network 106. The request filter 114, which serves as an intermediary for requests from client computer 104 directed to external web server 112. Although the request filter 114 serves as an intermediary, the request filter 114 may exist in any location in which the request filter can communication with the client computer 104. For example, in one embodiment, the organization's Internet service provider (ISP) provides the request filter 114. In another embodiment, the request filter 114 is software executing on external web server 112, filtering the requests to which the server 112 responds. In an embodiment of the present invention, the term "server" means a computer, computer platform, an adjunct to a computer or platform, or any component thereof.

In embodiments of the present invention, the request filter 114 may include software, hardware, firmware, or some combination of these components in order to filter requests. For example, in one embodiment, request filter 114 is a content (layer 7) intelligent switching device. In another embodiment, request filter 114 is a router with processing capabilities. In yet another embodiment, the request filter 114 software components integrate with proxy server hardware and/or software.

In an embodiment of the present invention, the request filter 114 includes a software or firmware component for reading the user agent string present in the header of a request. Specifically, the software extracts text or a code from the user agent string that identifies the version of anti-virus software installed on the client computer 104 submitting a request. The request filter software also includes routines for determining whether the version of virus protection software meets or exceeds a standard level necessary to gain access to the destination included in the request. If the version of the anti-virus software meets or exceeds the standard, the request is directed to the original destination, for example, external web server 112. If the version does not meet the standard, the request filter 114 directs the request to an alternate destination, such as internal web server 116. A system administrator or automated system updates the standard that the request filter 114 accesses as necessary to ensure that the standard or standards are appropriate for the various applications and servers to be accessed. The standard may be stored as a file, as an entry in a database, or in some other type of memory accessible by the request filter.

The alternate web server 116 may also take one or more of the following additional steps: sever the connection without informing client computer 104 why the request was denied, transmit an updated virus protection file version to the client computer 104, notify the anti-virus software provider that the client computer 104 is in need of an update, or perform some other step that results in updating the anti-virus software on the client computer 104.

In an embodiment of the present invention, the client computer 104 submits an HTTP request, which is filtered by the request filter 114. Upon transmission, the HTTP request is a computer data signal embodied in a digital data stream. HTTP messages include HTTP requests from clients to servers and responses from servers to clients. Each message includes headers. Request for comment (RFC) 1945 defines message format for an HTTP 1.0 message. An HTTP request includes request header fields. The request header fields include information about the client itself, including the user agent.

Figure 2:
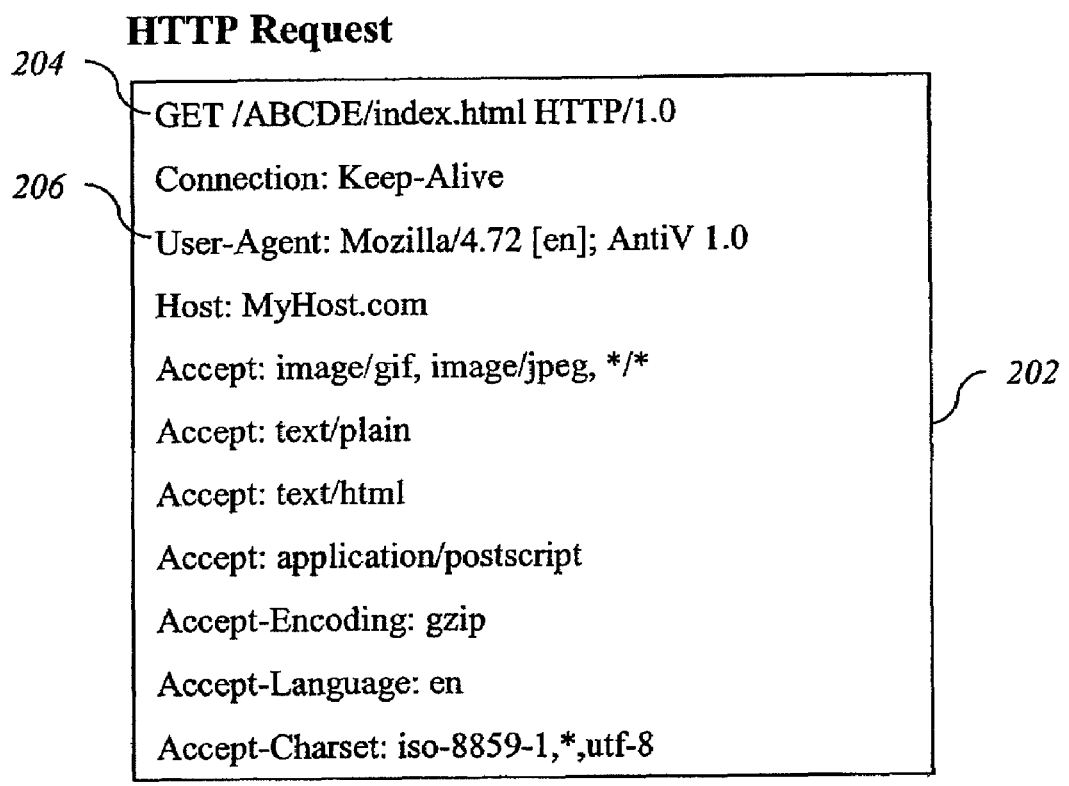
FIG. 2 illustrates an exemplary HTTP request in an embodiment of the present invention.

FIG. 2 illustrates an exemplary HTTP request in an embodiment of the present invention. The HTTP request 202 includes 11 fields. The first field 204 specifies the type of request, "GET," the destination of the request, "/ABCDE/index.html," and the version of HTTP used, "1.0." The request 202 also includes a user-agent header field 206. The field 206 includes a user agent string, "Mozilla/4.72 [en], AntiV 1.0." The user agent string in the embodiment shown includes the anti-virus software version as text at the end of the user agent string, "AntiV 1.0." The request filter 114 extracts this information from the user agent string in order to direct the request or in order to control access to particular information available via the internal 106 or external 110 networks.

Figure 3:
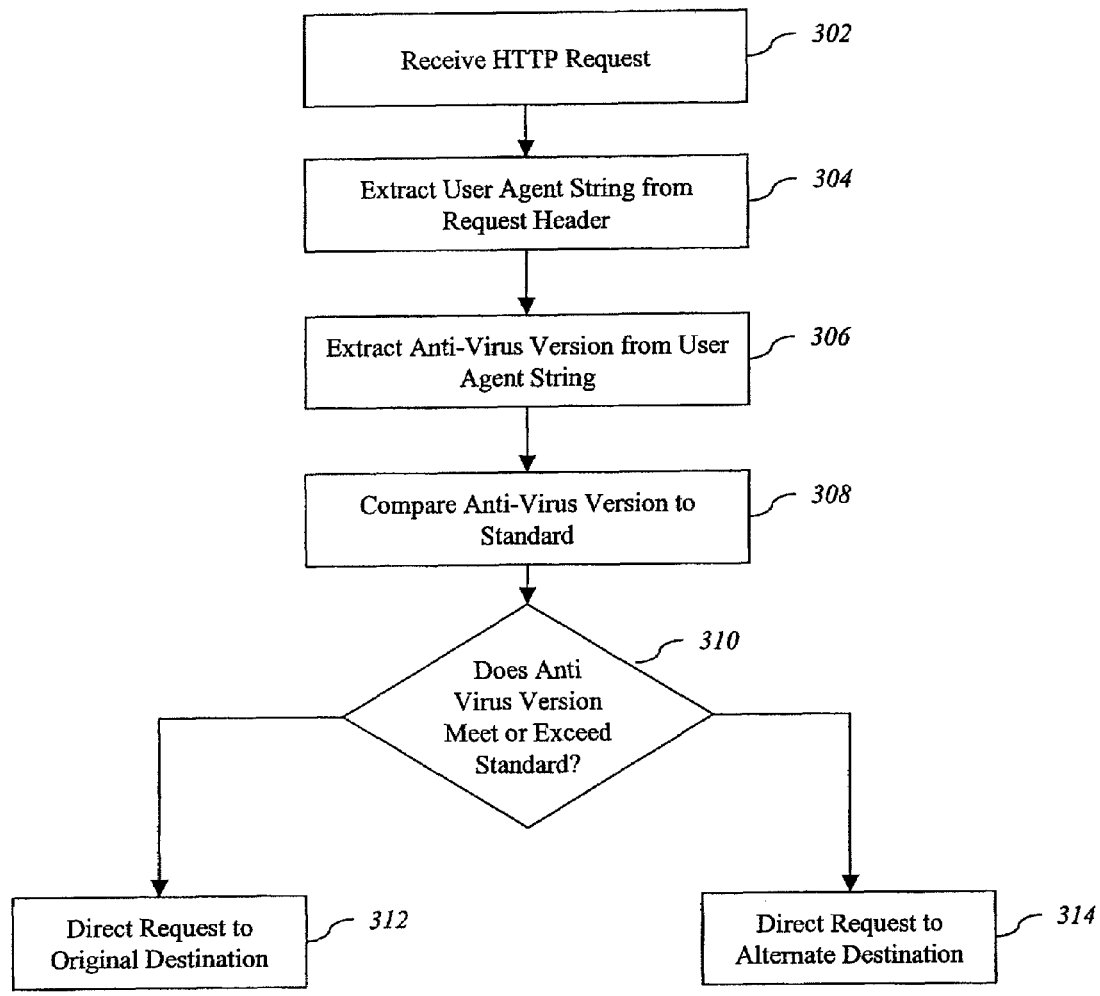
FIG. 3 is a flow chart illustrating an exemplary method for receiving and directing requests in an embodiment of the present invention.

FIG. 3 illustrates a method according to the present invention. The method illustrated in FIG. 3 may be performed by utilizing a computer-readable medium on which is encoded computer program code. The computer-readable medium may include a memory, such as random access memory, an electrically erasable programmable read-only memory (EE-PROM), a removable disk, or some other type of medium. In the method shown, the request filter (114) receives an HTTP request 302. In order for the request filter (114) to receive the requests, internal network (106) must forward all or a subset of all HTTP requests to the request filter (114). Software or firmware installed on the request filter (114) extracts the user agent string from the HTTP request header 304. The software then extracts the anti-virus version from the user agent string 306.

Embodiments of the present invention may utilize a variety of methods for encoding and decoding the anti-virus version. For example, in the embodiment shown in FIG. 2, the anti-virus version in the user agent string (206) is encoded as a text value. In another embodiment, the anti-virus version is encoded as a coordinated universal time (UTC) string. In yet another embodiment, the anti-virus version is encoded as a unique, random number.

Referring again to FIG. 3, the software on the request filter (114) next compares the anti-virus version to the standard 308. The standard is the version of anti-virus protection necessary to allow the request to proceed to the destination specified in the request. The standard and the anti-virus version contained in the user agent string may be in the same format or the request filter (114) may convert one or both of the formats so that they may be compared. If the anti-virus version meets or exceeds the standard 310, the request filter (114) directs the request to the original destination specified in the request 312. If not, the request filter (114) directs the request to an alternate destination, such as internal web server (116) 314.

The requirements of a particular server or application for a specific anti-virus protection version may vary, depending on factors such as whether the server is internal or external, whether the data is highly confidential or not, and other factors. Because the requirements may vary based on the server, one embodiment of the present invention includes multiple standards which are related to each server a user may access. In this manner, the anti-virus protection necessary for the request filter (114) to direct the request to the original destination can be varied based on the types of data, the location of the server, and other relevant factors.

The forgoing description of the preferred embodiments of the invention has been presented for the purpose of illustration and description and is not intended to be exhaustive or to limit the invention to the precise forms disclosed. Numerous modifications and adaptations thereof will be apparent to That which is claimed:

1. A method for handling computerized requests comprising:
   receiving a request to an external network from a computer comprising a user agent string and a specified destination in the external network, in a network component;
   extracting anti-virus data from the user agent string;
   comparing the anti-virus data with a standard; and
   directing the request based on a result of the comparison by redirecting the request to an alternate destination with respect to the specified destination in the external network and the network component when the anti-virus data does not meet the standard, wherein the alternate destination comprises a server in communication with the network component over an internal network and wherein the server, upon receiving the redirected request, severs a connection between the computer and the server comprising the alternate destination without informing the computer why the request was denied.

2. The method of claim 1, wherein the request comprises a hypertext transfer protocol request.

3. The method of claim 1, wherein directing the request comprises directing the request to an original destination of the request when the anti-virus data meets the standard.

4. The method of claim 1, wherein directing the request comprises directing the request to an original destination of the request when the anti-virus data exceeds the standard.

5. The method of claim 1, further comprising modifying the user agent string to include the antivirus data, wherein the anti-virus data comprises an anti-virus version date, wherein the user agent string has been modified by the computer to include the anti-virus version date, wherein the anti-virus version date has been converted by the computer to a coordinated universal time-expressed version date value, and wherein the coordinated universal time-expressed version date value is at the end of the user agent string.

6. The method of claim 1, further comprising automating system updates to update one or more standards accessed for use in the comparison.

7. The method of claim 1, further comprising:
   determining if the user agent string and the standard are in comparable formats; and
   converting the user agent string to a format which enables comparison with the standard.

8. The method of claim 1, further comprising:
   determining if the user agent string and the standard are in comparable formats, wherein the standard is dependent upon a resource being requested in the request; and
   converting the standard to a format which enables comparison with the user agent string.

9. A system for handling computerized requests comprising:
   a computer network;
   a processor in communication with the computer network;
   a request filter installed on the processor for comparing anti-virus data in a request to an external network received from a computer with a standard and directing the request based on the comparison by redirecting the request to an alternate destination with respect to a destination in the external network specified in the request and the request filter when the anti-virus data does not meet the standard, wherein the alternate destination comprises a server in communication with the request filter over an internal network and wherein the server, upon receiving the redirected request, severs a connection between the computer and the server comprising the alternate destination without informing the computer why the request was denied.

10. The system of claim 9, wherein the processor comprises a layer 7 switch.

11. The system of claim 9, wherein the processor comprises a server.

12. The system of claim 9, further comprising:
    a client computer in communication with the computer network; and
    a browser installed on the client computer, wherein the browser is operable for including antivirus data in a user agent string of a request.

13. A computer-readable medium on which is encoded computer program code for handling computerized requests comprising:
    program code for receiving a request to an external network from a computer comprising a user agent string and a specified destination in the external network, in a network component from a computer;
    program code for extracting anti-virus data from the user agent string;
    program code for comparing the anti-virus data with a standard; and
    program code for directing the request based on a result of the comparison, wherein directing the request based on a result of the comparison by redirecting the request to an alternate destination with respect to the specified destination and the network component when the anti-virus data does not meet the standard, wherein the alternate destination comprises a server in communication with the network component over an internal network and wherein the server, upon receiving the redirected request, severs a connection between the computer and the server comprising the alternate destination without informing the computer why the request was denied.

14. The computer-readable medium of claim 13, wherein the request comprises a hypertext transfer protocol request.

15. The computer-readable medium of claim 13, wherein the anti-virus data comprises an antivirus version date.

16. The computer-readable medium of claim 15, wherein the anti-virus version date comprises a coordinated universal time-expressed version date, wherein the coordinated universal time-expressed version date value is at the end of the user agent string.

17. The computer-readable medium of claim 13, wherein the program code for directing the request comprises program code for directing the request to an original destination of the request when the anti-virus data meets the standard.

18. The computer-readable medium of claim 13, wherein the program code for directing the request comprises program code for directing the request to an original destination of the request when the anti-virus data exceeds the standard.

19. The computer-readable medium of claim 13, wherein the program code for directing the request comprises program code for redirecting the request to an alternate destination when the standard exceeds the anti-virus data.

20. The computer-readable medium of claim 13, further comprising program code for modifying the user agent string to include the anti-virus data.

* * * * *